United States Patent
Omer et al.

(10) Patent No.: US 8,694,383 B2
(45) Date of Patent: Apr. 8, 2014

(54) PATH QUERIES

(75) Inventors: Ido Omer, Medina, WA (US); Eyal Ofek, Redmond, WA (US); Stephen L. Lawler, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 12/633,808

(22) Filed: Dec. 9, 2009

(65) Prior Publication Data

US 2011/0137741 A1  Jun. 9, 2011

(51) Int. Cl.
 *G06Q 30/00* (2012.01)
(52) U.S. Cl.
 USPC .......................................... 705/26.1
(58) Field of Classification Search
 USPC ............................. 705/26, 27, 26.1
 See application file for complete search history.

(56) References Cited

U.S. PATENT DOCUMENTS

| | | | |
|---|---|---|---|
| 6,477,460 B2 | 11/2002 | Kepler | |
| 7,451,041 B2 | 11/2008 | Laumeyer et al. | |
| 7,496,444 B1 | 2/2009 | Fried | |
| 2005/0288859 A1 | 12/2005 | Golding et al. | |
| 2006/0129313 A1 | 6/2006 | Becker et al. | |
| 2008/0319660 A1 | 12/2008 | Horvitz et al. | |
| 2009/0157499 A1 | 6/2009 | Panabaker et al. | |
| 2009/0198607 A1* | 8/2009 | Badger et al. | 705/37 |
| 2010/0217525 A1* | 8/2010 | King et al. | 705/10 |

OTHER PUBLICATIONS

Marmasse, et al., "Location-Aware Information Delivery with comMotion", Retrieved at <<http://alumni.media.mit.edu/~nmarmas/cmHUC2k.pdf>> In the proceedings of the 2nd international symposium on Handheld and Ubiquitous Computing, 2000, vol. 1927, pp. 157-171.

* cited by examiner

*Primary Examiner* — Mila Airapetian
(74) *Attorney, Agent, or Firm* — Steven Spellman; Jim Ross; Micky Minhas (57) ABSTRACT

Data identifying a path is received between two or more geographic locations. Path information is identified along or near the path. A relevance is associated to the path information. A subset of the path information having a highest relevance is provided.

19 Claims, 8 Drawing Sheets

PATH QUERIES

BACKGROUND

The development and proliferation of software-based map services (e.g., STREETS AND TRIPS from MICROSOFT CORPORATION, IGUIDANCE from INAV CORPORATION, and STREET ATLAS from DELORME) and web-based map services (BING MAPS from MICROSOFT CORPORATION, GOOGLE MAPS from GOOGLE INC., and YAHOO! MAPS from YAHOO! INC.) have fundamentally changed the way drivers plan commutes and road trips. Software-based map services and web-based map services may be collectively referred to herein as "computer-implemented map services." Prior to the development of computer-implemented map services, a driver typically relied on a paper map. However, a paper map may show possible routes without much distinction between the routes. As a result, a driver planning a route by manually selecting roads on the paper map may select a sub-optimal combination of roads. For example, the driver may not account for the number of lanes on each road, the number of traffic lights on the route, traffic congestion on the different roads, and the like.

Computer-implemented map services may provide enhanced route planning capabilities over paper maps. In particular, computer-implemented map services may provide a route determination interface whereby a user can enter two geographic locations. The route determination interface then may compute a route between the two geographic locations. For example, the route determination interface may provide the route having the shortest path or the shortest estimated travel time.

Computer-implemented map services may further provide a point of interest ("POI") search interface whereby a user can enter a geographic location. The computer-implemented map services then may provide various POIs near the geographic location. More advanced POI search interfaces may also provide POIs within a vicinity of a computed route. For example, the POI search interface may implement a polyline vicinity query that finds POIs near data points along the computed route.

One of the drawbacks with conventional POI search interfaces is the vast amount of information returned by the POI search interfaces. Some computer-implemented map services may attempt to organize the search results by category (e.g., restaurants, hotels, gas stations, etc.). However, the user is typically left to find relevant POIs from the returned search results without much additional guidance from the POI search interfaces.

It is with respect to these and other considerations that the disclosure made herein is presented.

SUMMARY

Technologies are described herein for providing path queries. Through the utilization of the technologies and concepts presented herein, a path (also referred to herein as a route) may be provided to a path information module. For example, a computer-implemented map service may provide the path to the path determination module upon computing the path between two geographic locations. The path information module may then compute POIs and other suitable path information along or near the path and rank the path information based on the user's expected use of the information. In particular, different path information may have a different relevance to the user depending on the location of the path information along the path. For example, attractions and hotels may be more relevant around the middle of the path where the user is more likely to stop and rest.

Conventional computer-implemented map services may provide a large list of POIs based on distance to a particular location or distance to a path (e.g., through a polyline vicinity query). The user is typically left to determine relevant POIs from the large list without much, if any, additional guidance. By ranking the relevance of the path information based on the likelihood that the user will use the path information, the path information module can provide more relevant path information to the user and significantly reduce the amount of overall information provided to the user over conventional computer-implemented map services.

In some embodiments, the path may also be provided to an advertising bidding module. The advertising bidding module may also be provided with user profile data associated with the user. The advertising bidding module may then initiate a bidding process whereby relevant businesses near (i.e., within a given distance from) or along the path may bid for advertisements. In particular, the advertising bidding module may solicit bids from businesses that are more relevant based on the user profile data. The computer-implemented map service may give more prominent advertisement placement and exposure to those businesses that reply with more favorable bids.

In some other embodiments, a path may further be provided to a path report module. For example, the path may be a fixed path, such as a path between a user's home and office, which frequently remains the same. The path report module may then generate a path report containing a variety of path report information along the path. The path report information may include, for example, consumer sales, entertainment, traffic-affecting events along the path, and the like. When the path is a fixed path, the path report may be provided to the user periodically (e.g., daily) through, for example, the user's mobile device, email address, vehicle, and the like. In this way, the user can be notified of useful information customized to the user's fixed path.

In yet other embodiments, a path may be provided to an alternate path module. A user constraints profile associated with a user may also be provided to the path determination module. The user constraints profile may include driving preferences of the user. For example, the user may prefer alternate paths having scenic views, access to shopping, attractions, and the like. The alternate path module may then generate alternate paths for the user based on the user's driving constraints profile. In particular, the alternate path module may maximize the user's preferences while also limiting the distance and/or commute time that the alternate paths add to the trip and/or stray from original path.

It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for providing path queries, in accordance with some embodiments. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
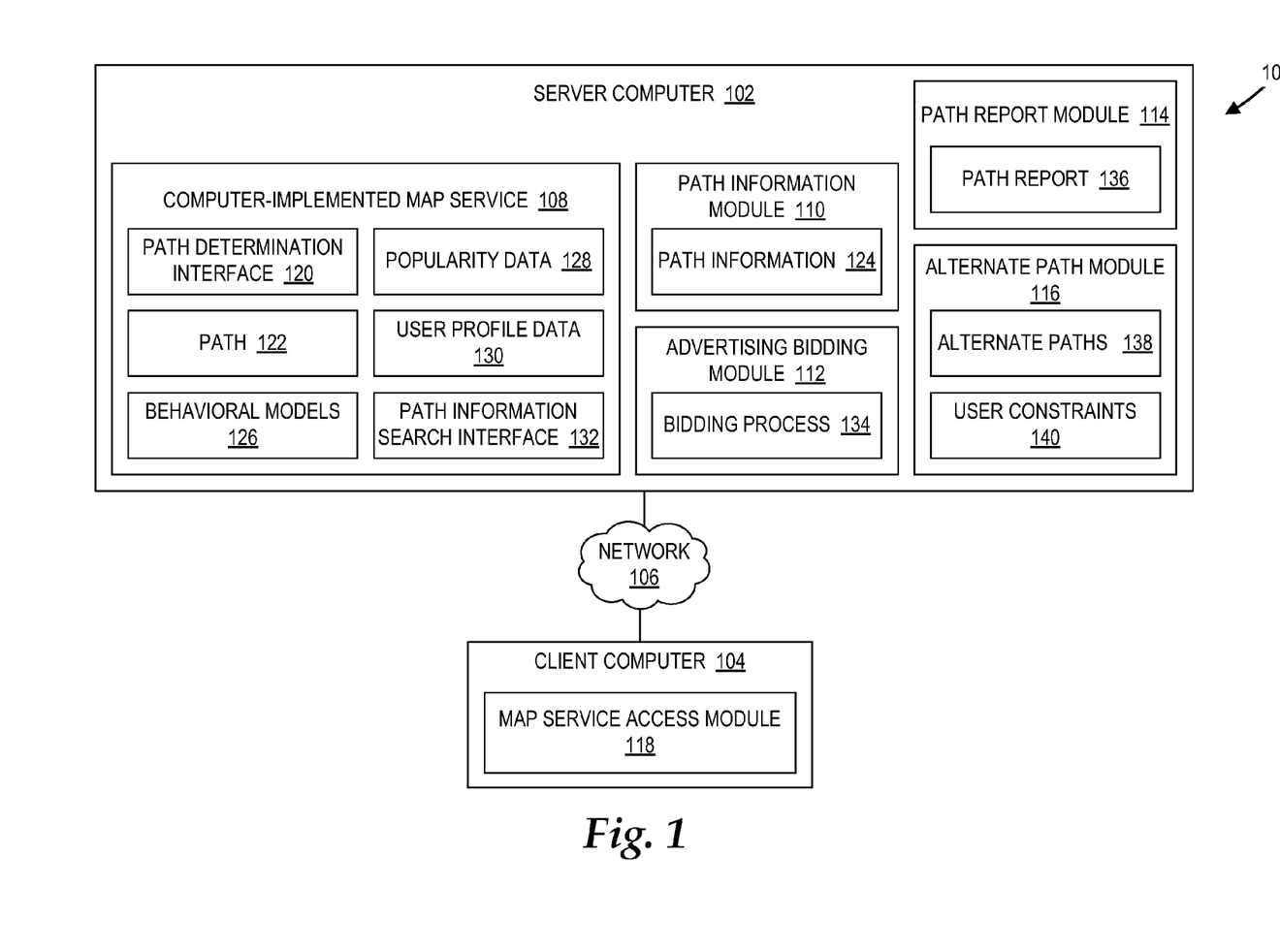
FIG. 1 is a computer architecture diagram showing an illustrative computer architecture configured to provide path queries, in accordance with some embodiments.

In the following detailed description, references are made to the accompanying drawings that form a part hereof, and which are shown by way of illustration specific embodiments or examples. Referring now to the drawings, in which like numerals represent like elements through the several figures, a computing system and methodology for implementing path queries will be described. In particular, FIG. 1 illustrates a computer architecture 100 configured to provide path queries, in accordance with some embodiments. The computer architecture 100 includes a server computer 102 and a client computer 104 coupled via a network 106. The server computer includes a computer-implemented map service 108, a path information module 110, an advertising bidding module 112, a path report module 114, and an alternate path module 116.

The client computer 104 includes map service access module 118 that enables a user at the client computer 104 to remotely access the computer-implemented map service 108. For example, the map service access module 118 may be a web browser or other suitable application. Although the computer-implemented map service 108 is illustrated as a web-based map service, it should be appreciated that the computer-implemented map service 108 may also be a software-based map service, in accordance with further embodiments.

The computer-implemented map service 108 may include a path determination interface 120 that enables a user to enter at least two geographic locations. In some embodiments, the user may specify a path from a current geographic location. In this case, the user may enter only one geographic location. Although not so limiting, embodiments described herein primarily refer to examples where at least two geographic locations are entered. In some cases, the user may enter a departing location from where the user begins her commute and a destination location to where the user ends her commute. The computer-implemented map service 108 may then compute a path 122 based on suitable path determination algorithms. For example, the path 122 may be the shortest distance between the two geographic locations or have the shortest estimated commute time. Upon computing the path 122, the computer-implemented map service 108 may cause the path 122, which may further include turn-by-turn directions, maps, and the like, to be displayed through the map service access module 118.

The computer-implemented map service 108 may also provide the path 122 to at least one of the path information module 110, the advertising bidding module 112, the path report module 114, and the alternate path module 116. In particular, the path information module 110, the advertising bidding module 112, the path report module 114, and the alternate path module 116 may perform respective queries whereby the path 122 serves as the input to the queries. The resulting output from the path information module 110, the advertising bidding module 112, the path report module 114, and the alternate path module 116 may be automatically pushed to the user or provided responsive to a user request, as described in greater detail below.

In further embodiments, the path 122 may also be determined by other suitable means. In one implementation, the user may manually enter the path 122 through the computer-implemented map service 108 or other suitable application. For example, the user may provide a fixed path, such as the path between the user's home and office, which frequently remains the same. In another implementation, the path 122 may be inferred based on the user's driving history, the user's current location, and/or the current day and time. For example, the user may take the same roads between home and the gym at 6:00 am. As a result, when the user leaves the home at 6:00 am on any given day, an inference can be made that the user is commuting to the gym.

The path information module 110 may be configured to compute POIs and other suitable path information 124 along or near the path 122 and to rank the path information 124 based on the user's expected use of the path information 124. Examples of other path information may include line data (e.g., a portion of a road is defined to have beautiful scenery, some defined range around downtown should be avoided during rush hour, etc.). In particular, the path information 124 may be ranked according to a relevance determination based on suitable information regarding the path 122. The information regarding the path 122 may include the distance of the path 122, the destination location, the estimated commute time, and the like. The relevance of the path information 124 may change at different points along the path 122. In a first example, attractions and hotels may be more relevant in the middle of the path 122, where the user may take a break from driving. In a second example, sales opportunities by businesses may be more relevant near stop points along the path 122, where the user leaves the vehicle, as opposed to highway areas. In a third example, if the destination location is an amusement park, such as the WALT DISNEY WORLD RESORT, child-related POIs in the path information 124 along the path 122 may have a higher relevance.

In a fourth example, the path information module 110 may determine the estimated commute time to be approximately twelve hours. In this case, behavioral models 126, which model the commuting behaviors of users (e.g., how long users drive before stopping, how many breaks users take, the location of businesses that users prefer, etc.), may indicate that the user is likely to split the commute. Further, the behavioral models 126 may indicate a user is not likely to stay at hotels near the departing location or the destination location. As a result, in light of the information in the behavioral models 126, the path information module 110 may associate a higher relevance to hotels around the middle of the path 122 where the user is more likely to stop and rest. When stop points (e.g., hotels, attractions) are determined, the path information module 110 may also determine additional POIs (e.g., restaurants, services, etc) near the stop points.

In a fifth example, the behavioral models 126 may place a higher relevance for gas stations located to the right of the travel direction because such gas stations can be accessed without adding u-turns to the path 122. However, the location of gas stations to the right of the travel direction may depend on the direction that the user is traveling. Thus, when the user is traveling from south to north, gas stations located east of a road may be associated with a higher relevance than gas stations located west of the road. In contrast, when the user is traveling from north to south, gas stations located west of the road may be associated with a higher relevance than gas stations located east of the road.

In a sixth example, popularity data 128 may indicate that certain path information is more popular than other path information in the path information 124. In some embodiments, the popularity data 128 may be generated through a "user click" whereby the user accesses (i.e., "clicks on") information about a particular POI through the computer-implemented map service 108 or other suitable application. Multiple user clicks by different users may imply that a given POI along the path 122 is more popular to users.

In some other embodiments, the popularity data 128 may be generated when users visit certain POIs. The location of the users may be recorded through, for example, global positioning system ("GPS") data retrieved from the users' mobile devices. For example, if more users visit a particular gas station and/or click on the gas station through the computer-implemented map service 108, then the popularity data 128 may associate a higher relevance to the gas station. The higher relevance may indicate that the gas station is more desired (e.g., has lower prices, is closer to the highway, etc.) over other nearby gas stations. In some cases, the GPS data as well as other user data may be retrieved upon the user providing consent.

In a seventh example, user profile data 130 may be collected through a user questionnaire when the user signs up for the computer-implemented map service 108. The user profile data 130 may indicate that a user has a wife and four children. In this case, the path information module 110 may infer that the six hour drive to San Diego is likely a family trip for the children. As a result, the path information module 110 may place a higher relevance towards multiple stops that are entertaining and suitable for children. The stops may also depend on the age of the kids. For example, if the kids are toddlers or younger, stops having baby changing stations may be associated with a higher relevance. In some embodiments, the user profile data 130 may also be recovered or inferred based on the user's previous path planning sessions or other users' previous path planning sessions.

Upon ranking the path information 124 according to relevance, as previously described, the computer-implemented map service 108 may provide a subset of the path information 124 having the highest relevance to the user. By providing only the subset of the path information 124 having the highest relevance to the user, the computer-implemented map service 108 can provide highly relevant path information while also reducing the overall amount of information that is provided to the user.

In some embodiments, the computer-implemented map service 108 may push the subset of the path information 124 having the highest relevance without request from the user. In particular, when the computer-implemented map service 108 outputs the path 122, the computer-implemented map service 108 may include the subset of the path information 124 while outputting the path 122 through the map service access module 118. For example, the computer-implemented map service 108 may embed trademarks or other graphical representations of relevant POIs directly onto a map showing the path 122. Further, when the user accesses one or more of the graphical representations embedded on the map, the path information module 110 may automatically reroute the path 122 to include commuting to and from the associated POIs.

In some other embodiments, the computer-implemented map service 108 may provide the subset of the path information 124 having the highest relevance responsive to a user request. In particular, the computer-implemented map service 108 may include a path information search interface 132. The path information search interface 132 may or may not be integrated into the path determination interface 120. A user may search the path information 124 for the path 122 through the path information search interface 132. For example, the user may request gas stations along the path 122. In response to receiving the request, the path information search interface 132 may output relevant gas stations along the path 122 and additional driving time needed to reach each of the gas stations, which the user can view through the map service access module 118.

In some embodiments, the map service access module 118 may be executed through a mobile device, a vehicle navigation system, or the like. In such implementations, the map service access module 118 may provide real-time or near real-time updates of the subset of the path information 124 outputted through the map service access module 118. In particular, the path information module 110 may adjust the relevance of the path information 124 in accordance with the location of the user.

The location of the user may be determined through GPS data retrieved from the mobile device, a vehicle navigation system, or the like. In a previously described example, the path information module 110 may associate a higher relevance to hotels around the middle of the path 122 where the user is more likely to stop and rest. Without GPS data, the path information module 110 can anticipate the middle of the path 122 based on the average user's driving speed. However, with GPS data, the path information module 110 can also adjust the middle of the path 122 based on the location of the user, depending on whether the user is driving slower or faster than the average user's driving speed.

The advertising bidding module 112 may be configured to initiate a bidding process 134 whereby relevant businesses near or along the path 122 may bid for advertisements. In particular, the advertising bidding module may solicit bids from businesses that are more relevant based on the path 122 and the user profile data 130. Businesses that reply with favorable bids may be associated with a higher relevance over other related businesses. As a result, these businesses may be given more prominent placement by the computer-implemented map service 108. In some embodiments, the bidding process 134 may be performed in advance prior to the path determination interface 120 generating the path 122. In some other embodiments, the bidding process 134 may be performed in real-time or near real-time upon the path determination interface 120 generating the path 122.

For example, the advertising bidding module 112 may provide a toy store with information indicating that a user is traveling along a path that passes by the toy store and is en route to an amusement park as the destination location. The advertising bidding module 112 may further provide the toy store with information from the user profile data 130 indicating the user has small children and information indicating that the user is planning a stop and rest at a hotel nearby. Accordingly, the toy store may infer that the user is traveling with small children. In this case, the toy store may be willing to pay a substantial premium in order to advertise to the user over the general population who may not stop at or have any interest in the toy store. That is, the toy store may be willing to pay more than other businesses that are not relevant to the user given the same information.

The path report module 114 may be configured to generate a customized path report 136 for the path 122 and to periodically transmit the customized path report 136 to a user through, for example, the user's mobile device, email address, vehicle, and the like. The path 122 may be fixed path, such as a path between a user's home and office, which frequently remains the same. In some embodiments, a user may manually enter the fixed path. In some other embodiments, the path 122 may be inferred based on historical data, such as GPS data, indicating that the user frequently commutes the fixed path.

The path report module 114 may generate the path report 136 containing a variety of path report information along the path 122. Such path report information may include, for example, consumer sales, entertainment, traffic-affecting events along the path, and the like. For example, a sporting event near the path 122 may affect the user's commute home from the office. The path report module 114 may notify or remind the user when such a sporting event occurs. When the path 122 is a fixed path, the path report 136 may be provided to the user periodically (e.g., daily). For example, the path report 136 may be provided to the user each morning or evening in advance of the events contained in the path report 136.

The path report information included in the path report 136 may correspond to the frequency at which the path report 136 is distributed to the user. For example, if the path report 136 is transmitted daily to the user, then the path report information may include events for each particular day. Similarly, if the path report 136 is transmitted weekly to the user, then the path report information may include events for the corresponding week. In further embodiments, a user may customize the path report information included in the path report 136.

The user may sign up for the path report 136 through the computer-implemented map service 108. For example, the path report 136 may be provided as a value-added service of the computer-implemented map service 108. In this way, the path report 136 may increase the user's exposure to and utilization of the computer-implemented map service 108 even when the user would not otherwise access the computer-implemented map service 108. For example, when the path 122 is fixed, the user would likely not access the computer-implemented map service 108 to request the path 122. The user may also be able to forward the path report 136 to other users, thereby further increasing the exposure of the computer-implemented map service 108.

The alternate path module 116 may be configured to generate alternate paths 138 to the path 122 based on user constraints 140 of a user. The user constraints 140 may include commuting preferences of the user. For example, the user may prefer commutes having scenic views, access to shopping, attractions, fewer left turns, more populous roads, lower crime statistics, more shade, and the like. The alternate path module 116 may maximize or attempt to maximize the user's preferences while also limiting the distance that the alternate paths 138 add to the trip and/or stray from the original path 122. For example, the user may specify a distance limit by which the alternate paths 138 stray from the original path 122. The alternate path module 116 may generate the alternate paths 138 based on any suitable data sources. For example, the alternate path module 116 may identify alternate paths having scenic views based on topological maps, photographs of the alternate paths, user reviews of the alternate paths, and the like.

Figure 2:
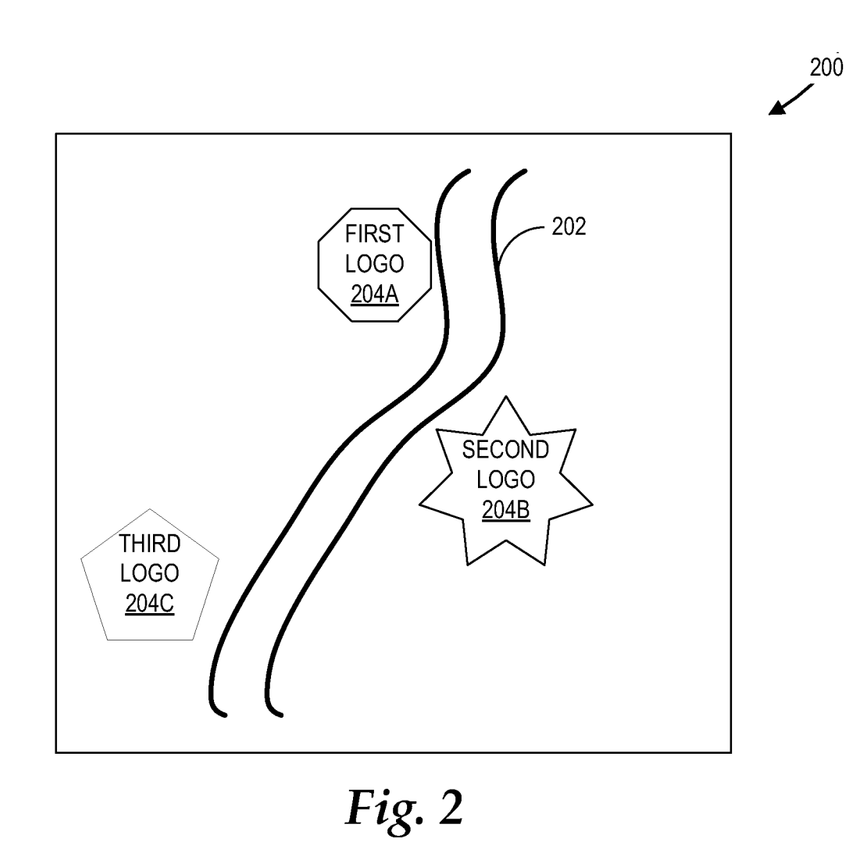
FIG. 2 is a diagram showing an illustrative implementation of a map illustrating a path, in accordance with some embodiments.

Referring now to FIG. 2, a diagram shows an illustrative implementation of a map 200 illustrating the path 122, in accordance with some embodiments. In particular, the map 200 of the path 122 may be generated and provided by the computer-implemented map service 108 and viewed by users through the map service access module 118. Although not so illustrated in FIG. 2, the map 200 may further include text, additional graphics, audio, video, and combinations thereof. For example, the map 200 may include turn-by-turn directions.

As illustrated in FIG. 2, at least a portion of the map 200 illustrates a road 202. According to some embodiments, the path information module 110 may embed at least part of the path information 124 onto the map 200. For example, the path information 124 may embed trademarks and other graphical representations associated with POIs in the path 122 having the highest relevance according to the behavioral models 126, the popularity data 128, and/or the user profile data 130. Further, the bidding process 134 may also affect the relevance of the path information 124. In particular, a first logo 204A corresponding to a first POI, a second logo 204B corresponding to a second POI, and a third logo 204C corresponding to a third POI may be displayed adjacent to the road 202. The first logo 204A, the second logo 204B, and the third logo 204C may be collectively referred to as logos 204.

The actual location of the POIs in the real world may correspond to the position of the corresponding logos 204 relative to the road 202 on the map 200. In this way, users can be provided with a visual representation of the location of the POIs. In some embodiments, when a user accesses one or more of the logos 204, the path information module 110 may adjust the path 122 to include the corresponding POIs. For example, when a user accesses (e.g., clicks on) the first logo 204A, the path information module 110 may adjust the path 122 to include the first business. Thus, if the path 122 originally includes a direct route from a first location to a second location, the adjusted path 122 may include a route from the first location to the first business and from the first business to the second location.

In some embodiments, the computer-implemented map service 108 may adjust the display of logos on the map 200 depending on the current location of the user. For example, as a user drives along the road 202, the computer-implemented map service 108 may remove logos for POIs that the user has driven away from and insert logos for POIs that the user is reaching near. The computer-implemented map service 108 may further adjust the display of logos on the map 200 depending on the type of POI. For example, a user may utilize more time to determine whether to stay at a hotel versus eating at a restaurant. Thus, the computer-implemented map service 108 may display the logo of a restaurant when the user reaches within a significantly close distance to the restaurant in order to reduce the amount of information shown on the map 200 at any given time. In contrast, the computer-implemented map service 108 may display the logo of a hotel much further in advance of reaching the hotel. In this way, the user is allowed more time in deciding whether to stay at the hotel.

Figure 3:
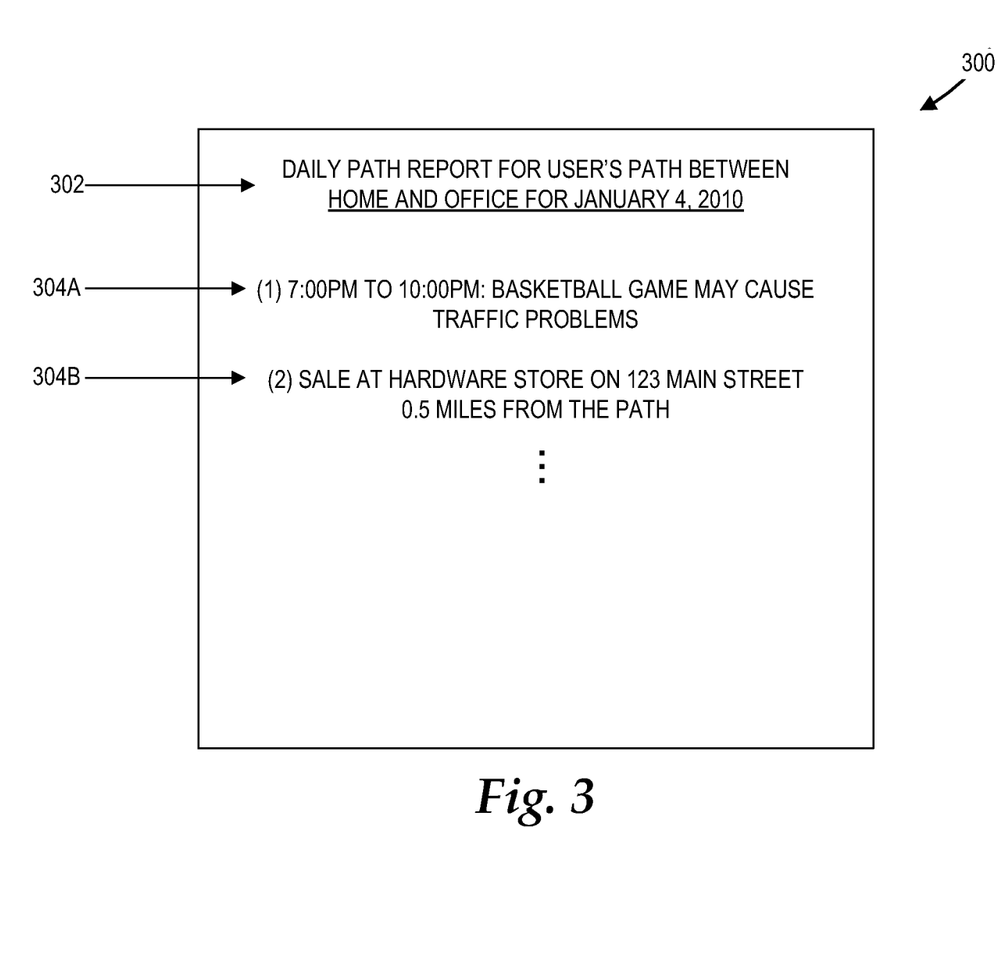
FIG. 3 is a diagram showing an illustrative representation of a path report, in accordance with some embodiments.

Referring now to FIG. 3, a diagram shows an illustrative representation of the path report 136, in accordance with some embodiments. The path report 136 provides path report information for a fixed path between a user's home and office. The example path report 136 of FIG. 3 is distributed daily to the user, although the path report 136 may be distributed according to other schedules.

As illustrated in FIG. 3, the path report 136 includes a title portion 302. The title portion 302 indicates that the path report 136 is for the fixed path between the user's home and office and that the path report 136 is for Jan. 4, 2010. The path report 136 further includes at least a first information portion 304A and a second information portion 304B. The first information portion 304A, the second information portion 304B, and other information portions may be collectively referred to as information portions 304. The first information portion 304A indicates a basketball game scheduled between 7:00 pm and 10:00 pm. The first information portion 304A warns that the basketball game may affect traffic along the fixed path around that time frame. The second information portion 304B indicates a sale at a hardware store on 123 Main Street that is 0.5 miles from the fixed path.

Figure 4:
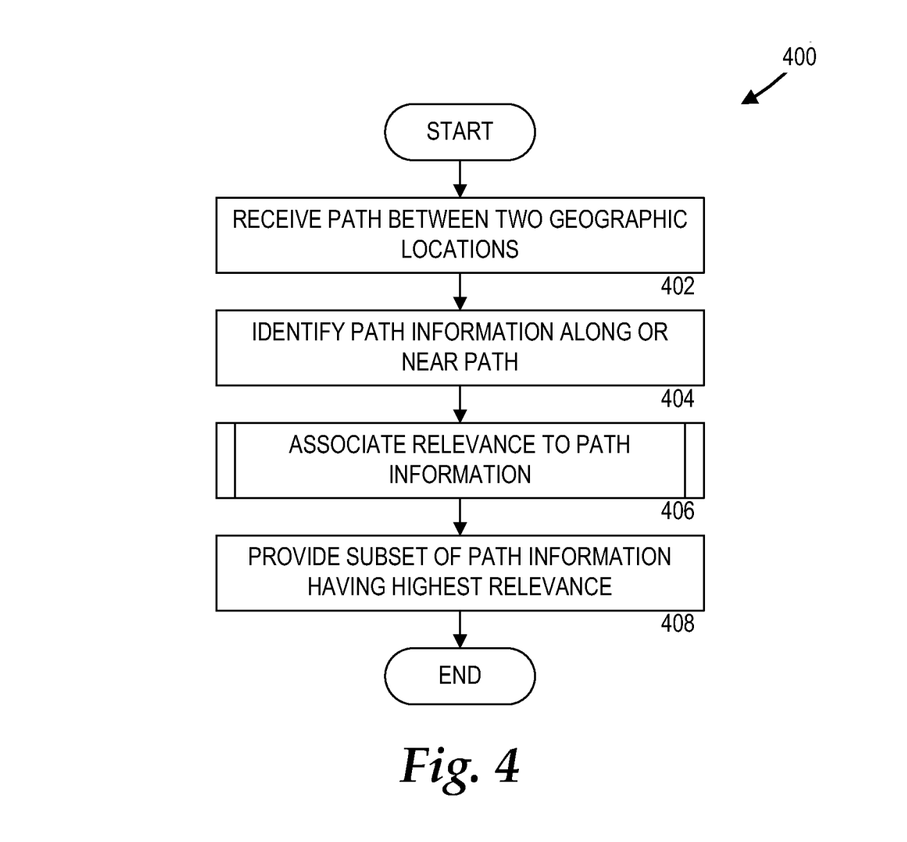
FIG. 4 is a flow diagram illustrating a method for providing relevant path information, in accordance with some embodiments.
Figure 5:
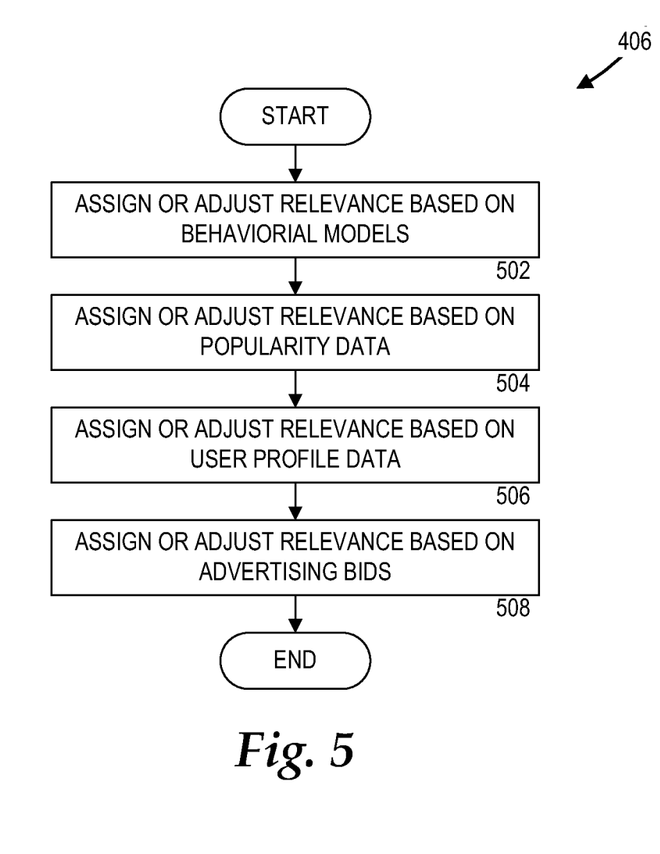
FIG. 5 is a flow diagram illustrating a method for associating relevance to path information, in accordance with some embodiments.
Figure 6:
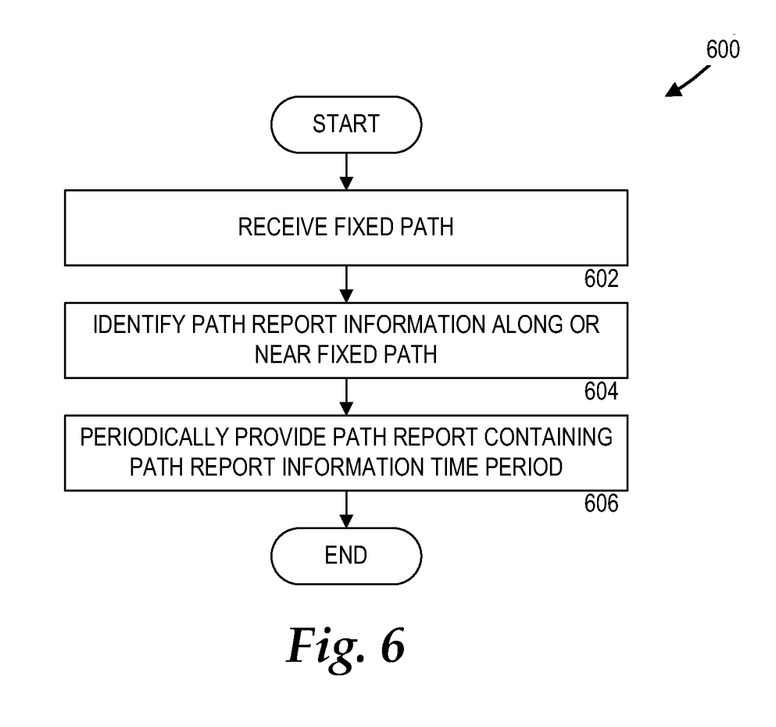
FIG. 6 is a flow diagram illustrating a method for distributing a path report, in accordance with some embodiments.
Figure 7:
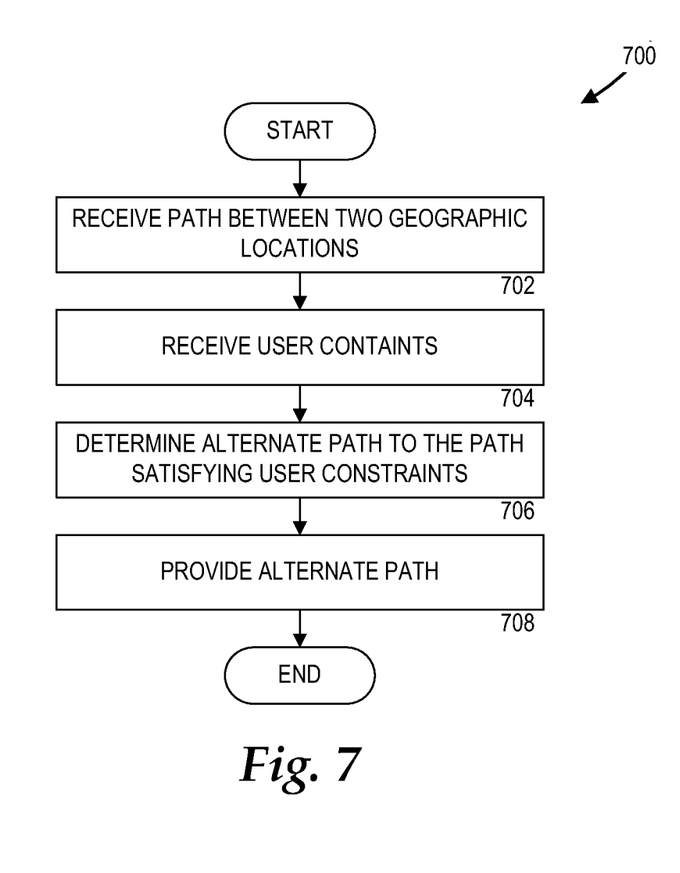
FIG. 7 is a flow diagram illustrating a method for providing an alternate path, in accordance with some embodiments.

Referring now to FIGS. 4, 5, 6, and 7, flow diagrams illustrate various methods for providing path queries. In particular, the flow diagram of FIG. 4 illustrates a method for providing relevant path information, such as the path information 124, in accordance with some embodiments. The flow diagram of FIG. 5 illustrates a method for associating relevance to path information, such as the path information 124, in accordance with some embodiments. The flow diagram of FIG. 6 illustrates a method for distributing a path report, such as the path report 136, in accordance with some embodiments. The flow diagram of FIG. 7 illustrates a method for providing an alternate path, such as the alternate paths 138, in accordance with some embodiments.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a method 400 begins at operation 402, where the path information module 110 receives a path, such as the path 122, between two or more geographic locations. In some embodiments, the path 122 may be generated by the computer-implemented map service 108 when a user enters the geographic locations through the path determination interface 120. In some other embodiments, the path 122 may be manually submitted by a user. For example, the user may manually submit a fixed path. When the path information module 110 receives the path 122, the method 400 proceeds to operation 404.

At operation 404, the path information module 110 identifies path information, such as the path information 124, along or near the path 122. For example, the path information 124 may include POIs within a fixed distance from the path 122. The method 400 then proceeds to operation 406, where the path information module 110 associates a relevance to the path information 124. In particular, a relevance may be associated with each POI and other path information in the path information 124. The relevance may be specified by a numerical score or other suitable ranking methodology. The operation 406 is described in greater detail below with respect to FIG. 5. When the path information module 110 associates a relevance to the path information 124, the method 400 proceeds to operation 408.

At operation 408, the computer-implemented map service 108 provides a subset of the path information 124 having the highest relevance to a user, who can view the subset of the path information 124 having the highest relevance through the map service access module 118. The subset of the path information 124 may be provided alone or in conjunction with the path 122. For example, the path 122 may be illustrated in one or more maps that are provided to the user. The maps may be embedded with the subset of the path information 124. For example, if the subset of the path information 124 includes POIs, trademarks or other graphical representations of the POIs can be embedded into the maps. In this way, the subset of the path information 124 can be graphically displayed. In other implementations, the subset of the path information 124 may be provided as text, graphics, audio, video, and combinations thereof.

In some embodiments, the path information 124 may be pushed to the user without user request. In this case, the computer-implemented map service 108 may determine that the high relevance of the subset of the path information 124 may be useful to the user. For example, if the user requests a path, such as the path 122, for two or more geographic locations, the computer-implemented map service 108 may provide the path 122 to the user along with the subset of the path information 124 having the highest relevance.

In some other embodiments, the path information 124 may be provided to the user upon user request. In this case, the computer-implemented map service 108 may receive a request for path information through the path information search interface 132. In response to receiving the request for path information, the computer-implemented map service 108 may provide the subset of the path information 124 to the user.

In FIG. 5, additional details regarding the operation 406 of FIG. 4 will be described. The operation 406 may include one or more of the sub-operations 502-508 that assign and/or adjust relevance to the path information 124. It should be appreciated that the sub-operations 502-508 are merely examples of relevance determinations for the path information 124, and other suitable relevance determinations may be similarly utilized. The sub-operations 502-506 may be performed by the path information module 110, while the sub-operations 508 may be performed by the advertising bidding module 112.

At sub-operation 502, the path information module 110 assigns or adjusts the relevance of the path information 124 based on the behavioral models 126 that model the commuting behavior of users. At operation 504, the path information module 110 assigns or adjusts the relevance of the path information 124 based on the popularity data 128 indicating the popularity of the path information 124. As previously described, the popularity data 128 may generated by user clicks of websites associated with the path information 124, visits to locations identified in the path information 124, and the like.

At sub-operation 506, the path information module 110 assigns or adjusts the relevance of the path information 124 based on the user profile data 130. For example, when a user requests path information for a given path, such as the path 122, the user may also submit the user profile data 130 to the computer-implemented map service 108. At sub-operation 508, the advertising bidding module 112 assigns or adjusts the relevance of the path information 124 based on advertising bids received from businesses as a result of the bidding process 134. For example, the advertising bidding module 112 may assign higher relevance or adjust the relevance higher for more favorable bids and assign lower relevance or adjust the relevance lower for less favorable bids.

In FIG. 6, a method 600 begins operation 602, where the path report module 114 receives a fixed path that frequently remains the same. The user may manually enter the fixed path through the computer-implemented map service 108. In the alternative, the computer-implemented map service 108 may infer the fixed path through GPS data or and other suitable historical data. When the path report module 114 receives the fixed path, the method 600 proceeds to operation 604.

At operation 604, the path report module 114 identifies path report information near or along the fixed path. For example, the path report information may include information about traffic information, shopping, entertainment, and the like. When the path report module 114 identifies the path report information near or along the fixed path, the method 600 proceeds to operation 606, where the path report module 114 periodically provides a path report, such as the path report 136, to the user. The path report 136 may be distributed daily, weekly, monthly, or other suitable frequency. The path report 136 may be distributed to the user's mobile device, email address, vehicle, or the like.

In FIG. 7, the method 700 begins at operation 702, where the alternate path module 116 receives at path, such as the path 122, between two or more geographic locations. In some embodiments, the path 122 may be generated by the computer-implemented map service 108 when a user enters the geographic locations through the path determination interface 120. In some other embodiments, the path 122 may be manually submitted by a user. When the path information module 110 receives the path 122, the method 700 proceeds to operation 704.

At operation 704, alternate path module 116 receives user constraints, such as the user constraints 140. The user constraints 140 may include commuting preferences for a particular user. The method 700 then proceeds to operation 706, where the alternate path module 116 determines one or more alternate paths, such as the alternate paths 138, that satisfy the user constraints 140. In particular, the alternate paths 138 may maximize or attempt to maximize the user's commuting preferences in the user constraints 140, while also limiting distance and/or commuting time added by detouring from the path 122. The method 700 then proceeds to operation 708, where computer-implemented map service 108 provides the alternate paths 138 to the user.

Figure 8:
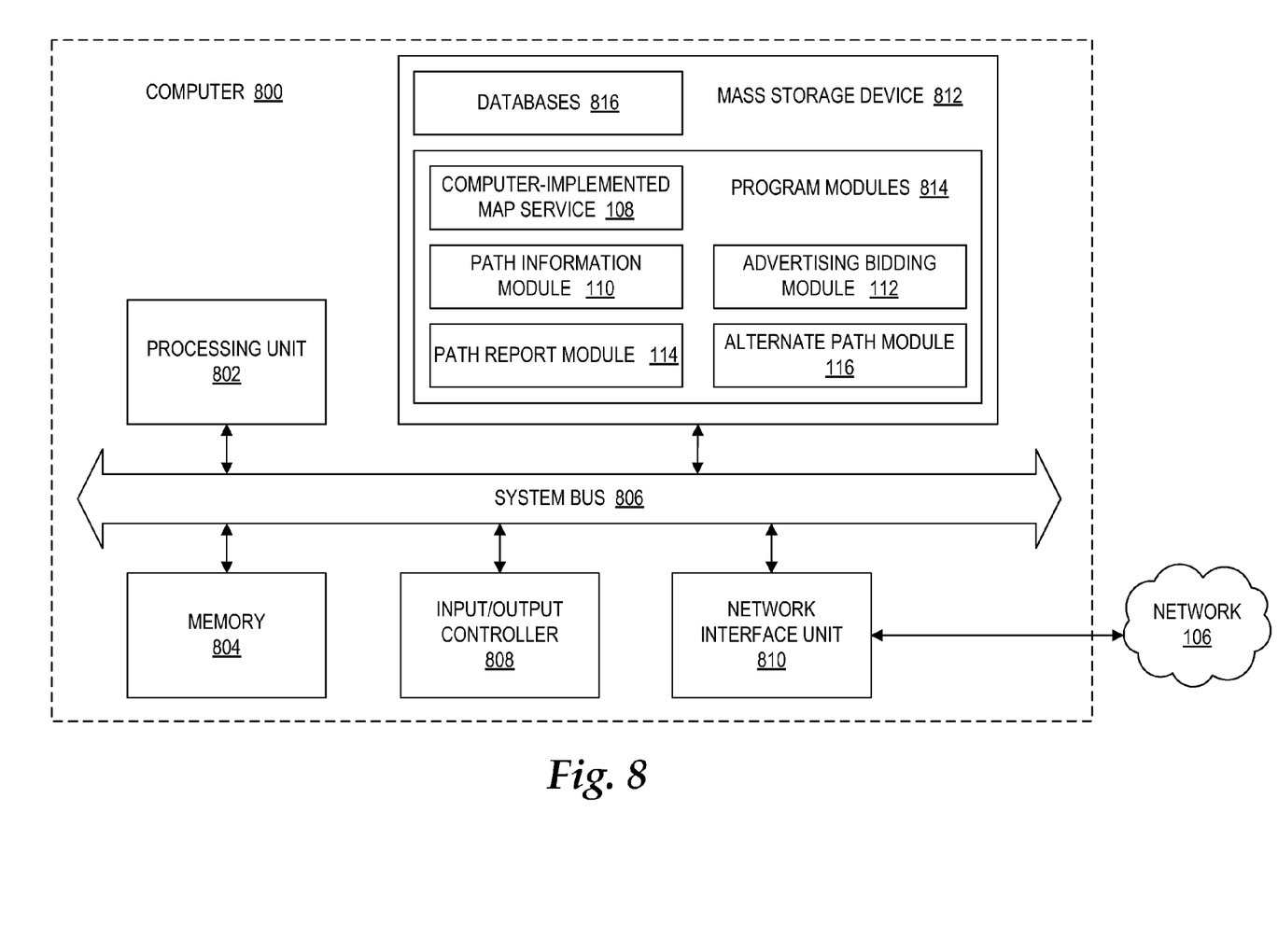
FIG. 8 is a computer architecture diagram showing illustrative computer hardware architectures for a computing system capable of implementing the embodiments presented herein.

Referring now to FIG. 8, an example computer architecture diagram showing a computer 800 is illustrated. An example of the computer 800 may include the server computer 102 and the client computer 104 of FIG. 1. The computer 800 may include a processing unit 802 ("CPU"), a system memory 804, and a system bus 806 that couples the memory 804 to the CPU 802. The computer 800 may further include a mass storage device 812 for storing one or more program modules 814 and one or more databases 816.

Examples of the program modules 814 may include the computer-implemented map service 108, the path information module 110, the advertising bidding module 112, the path report module 114, the alternate path module 116, and the map service access module 118. The database 816 may be utilized to store the path 122, path information 124, the behavioral models 126, the popularity data 128, the user profile data 130, the bidding process 134, the path report 136, the alternate paths 138, and the user constraints 140, among other information.

The mass storage device 812 may be connected to the CPU 802 through a mass storage controller (not shown) connected to the bus 806. The mass storage device 812 and its associated computer-storage media may provide non-volatile storage for the computer 800. Although the description of computer-storage media contained herein refers to a mass storage device, such as a hard disk or CD-ROM drive, it should be appreciated by those skilled in the art that computer-storage media can be any available computer storage media that can be accessed by the computer 800.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 106. The computer 800 may connect to the network 106 through a network interface unit 810 connected to the bus 806. It should be appreciated that the network interface unit 810 may also be utilized to connect to other types of networks and remote computer systems. The computer 800 may also include an input/output controller 808 for receiving and processing input from a number of input devices (not shown), including a keyboard, a mouse, a microphone, and a game controller. Similarly, the input/output controller 808 may provide output to a display or other type of output device (not shown).

The bus 806 may enable the processing unit 802 to read code and/or data to/from the mass storage device 812 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 814 may include software instructions that, when loaded into the processing unit 802 and executed, cause the computer 800 to provide path queries. The program modules 814 may also provide various tools or techniques by which the computer 800 may participate within the overall systems or operating environments using the components, flows, and data structures discussed throughout this description. For example, the program modules 814 may implement routines for providing relevant path information, associating relevance to path information, distributing a path report, and providing an alternate path, as previously described above with reference to FIGS. 4-7.

In general, the program modules 814 may, when loaded into the processing unit 802 and executed, transform the processing unit 802 and the overall computer 800 from a general-purpose computing system into a special-purpose computing system customized to provide path queries. The processing unit 802 may be constructed from any number of transistors or other discrete circuit elements, which may individually or collectively assume any number of states. More specifically, the processing unit 802 may operate as a finite-state machine, in response to executable instructions contained within the program modules 814. These computer-executable instructions may transform the processing unit 802 by specifying how the processing unit 802 transitions between states, thereby transforming the transistors or other discrete hardware elements constituting the processing unit 802.

Encoding the program modules 814 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 814 may transform the physical state of the semiconductor memory, when the software is encoded therein. For example, the program modules 814 may transform the state of transistors, capacitors, or other discrete circuit elements constituting the semiconductor memory.

As another example, the computer-storage media may be implemented using magnetic or optical technology. In such implementations, the program modules 814 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing path queries are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing path queries, the method comprising computer-implemented operations for:
   receiving, through a computer having a processor and a memory, data identifying a path between at least two geographic locations including a departing location and a destination location;
   identifying, through the computer, path information along or near the path;
   associating, through the computer, a relevance to the path information based on behavioral models that model commuting behaviors of users, the commuting behaviors including a length of time that the users drive before taking breaks during a commute from the departing location to the destination location; and
   providing, through the computer, a subset of the path information having a highest relevance in accordance with the commuting behaviors.

2. The computer-implemented method of claim 1, wherein receiving data identifying a path between at least two geographic locations comprises:
   receiving, through the computer, the at least two geographic locations; and
   upon receiving the at least two geographic locations, computing, through the computer the path based on the two geographic locations.

3. The computer-implemented method of claim 1, wherein identifying path information along or near the path comprises:
   identifying, through the computer, points of interest along or near the path.

4. The computer-implemented method of claim 3, the method further comprising:
   generating user-based popularity data based on a number of user accesses of the points of interest via a computer-implemented map service; and
   associating additional relevance to the path information based on the user-based popularity data.

5. The computer-implemented method of claim 1, further comprising:
   receiving, through the computer, user profile data specifying a profile of a user associated with the path, the user profile data specifying a child of the user and age of the child; and
   associating, through the computer, additional relevance to the path information based on the user profile data including the child and the age of the child.

6. The computer-implemented method of claim 1, the method further comprising computer-implemented operations for:
   receiving, through the computer, user profile data specifying a profile of a user associated with the path, the user profile data specifying a child of the user and age of the child;
   submitting, through the computer, information regarding the path and the user profile data including the child and the age of the child to businesses near or along the path;
   upon submitting information regarding the path and the user profile data to businesses near or along the path, receiving, through the computer, bids from one or more of the businesses; and adjusting, through the computer, the relevance of the path information based on the bids.

7. The computer-implemented method of claim 1, wherein the path comprises a fixed path through which the user commutes multiple times at a frequency, and wherein the method further comprises computer-implemented operations for:
periodically transmitting, through the computer and at the frequency, a path report containing path report information associated with the fixed path.

8. The computer-implemented method of claim 1, wherein providing, through the computer, a subset of the path information having a highest relevance in accordance with the commuting behaviors comprises pushing, from the computer to a user device through a network, the subset of the path information having the highest relevance without user request.

9. The computer-implemented method of claim 1, wherein providing, through the computer, a subset of the path information having a highest relevance in accordance with the commuting behaviors comprises providing, from the computer to a user device through a network, the subset of the path information having the highest relevance response to a user request.

10. The computer-implemented method of claim 1, the method further comprises computer-implemented operations for:
receiving, through the computer, a user-defined path constraint specifying a commuting preference; and
determining, through the computer, an alternative path satisfying the user-defined path constraint between the geographic locations.

11. A computer system, comprising:
a processor;
a memory operatively coupled to the processor; and
a program module (i) which executes in the processor from the memory and (ii) which, when executed by the processor, causes the computer system to provide path queries by
receiving data identifying at least two geographic locations including a departing location and a destination location,
generating a path through the at least two geographic locations,
identifying path information along or near the path,
determining a likelihood of users utilizing the path information based on behavioral models that model commuting behaviors of users, the commuting behaviors including a length of time that the users drive before taking breaks during a commute from the departing location to the destination location and a number of breaks that users take during the commute,
in response to determining a higher likelihood of the users utilizing the path information based on the behavioral models, associating a higher relevance to the path information,
in response to determining a lower likelihood of the users utilizing the path information based on the behavioral models, associating a lower relevance to the path information, and
providing the path and a subset of the path information having a highest relevance in accordance with the commuting behaviors.

12. The computer system of claim 11, wherein identifying path information along or near the path comprises
identifying points of interest along or near the path, the points of interest comprising at least one of restaurants, hotels, gas stations, and attractions.

13. The computer system of claim 12, wherein the program module, when executed by the processor, further causes the computer system to provide path queries by
determining a popularity of the path information based on popularity data that indicate popularity of the points of interest based on a number of user accesses,
in response to determining a higher popularity of the path information based on the popularity data that indicate popularity of the points of interest based on the number of user accesses, associating a higher additional relevance to the path information, and
in response to determining a lower popularity of the path information based on the popularity data that indicate popularity of the points of interest based on the number of user accesses, associating a lower additional relevance to the path information.

14. The computer system of claim 11, wherein the program module, when executed by the processor, further causes the computer system to provide path queries by
receiving user profile data specifying a profile of a user associated with the path, the user profile data specifying a child of the user and age of the child,
determining a relation of the user profile data including the child and the age of the child to the path information,
in response to determining a higher relation of the user profile data including the child and the age of the child to the path information, associating a higher relevance to the path information, and
in response to determining a lower relation of the user profile data including the child and the age of the child to the path information, associating a lower relevance to the path information.

15. The computer system of claim 11, wherein the program module, when executed by the processor, further causes the computer system to provide path queries by
receiving user profile data specifying a profile of a user associated with the path, the user profile data specifying a child of the user and age of the child,
submitting information regarding the path and the user profile data including the child and the age of the child to businesses near or along the path,
upon submitting information regarding the path and the user profile data including the child and the age of the child to businesses near or along the path, receiving bids from one or more of the businesses, and
adjusting the relevance of the path information based on the bids.

16. The computer system of claim 11, wherein the path comprises a fixed path through which the user commutes multiple times at a frequency, and wherein program module, when executed by the processor, further causes the computer system to provide path queries by
periodically transmitting, at the frequency, a path report containing path report information associated with the fixed path, the path report information comprising at least one of traffic information, shopping, and entertainment, the path report transmitted to at least one of a user's mobile device, email address, and vehicle.

17. The computer system of claim 11 wherein providing the path and a subset of the path information having a highest relevance comprises
embedding the subset of the path information into a map illustrating the path, and
providing the map illustrating the path and having the embedded subset of the path information.

18. A computer-readable storage medium that is not a signal and having computer-executable instructions stored thereon which, when executed by a computer, cause the computer to:
- receive at least two geographic locations from a user, the at least two geographic locations including a departing location and a destination location;
- determine a path through the at least two geographic locations;
- generate a map illustrating the path through the at least two geographic locations;
- identify path information along or near the path;
- associate a relevance to the path information based on (i) behavioral models that model commuting behaviors of users, the commuting behaviors including a length of time that the users drive before taking breaks during a commute from the departing location to the destination location, a number of breaks that users take during the commute, and locations of businesses preferred by the users, (ii) user-based popularity data that indicate popularity of the path information, the user-based popularity data based on a number of user accesses of points of interest via a computer-implemented map service, and (iii) user profile data specifying a profile of the user, the user profile data specifying a child of the user and age of the child;
- embed a subset of the path information having a highest relevance into the map illustrating the path; and
- provide the map illustrating the path and having the embedded subset of the path information.

19. The computer-implemented method of claim 1, wherein providing, through the computer, a subset of the path information having a highest relevance in accordance with the commuting behaviors comprises providing, through the computer, information on stop points along the path where the users can stop in accordance with the length of the time that the users drive taking breaks during a commute from the departing location to the destination location.

\* \* \* \* \*